2,872,017

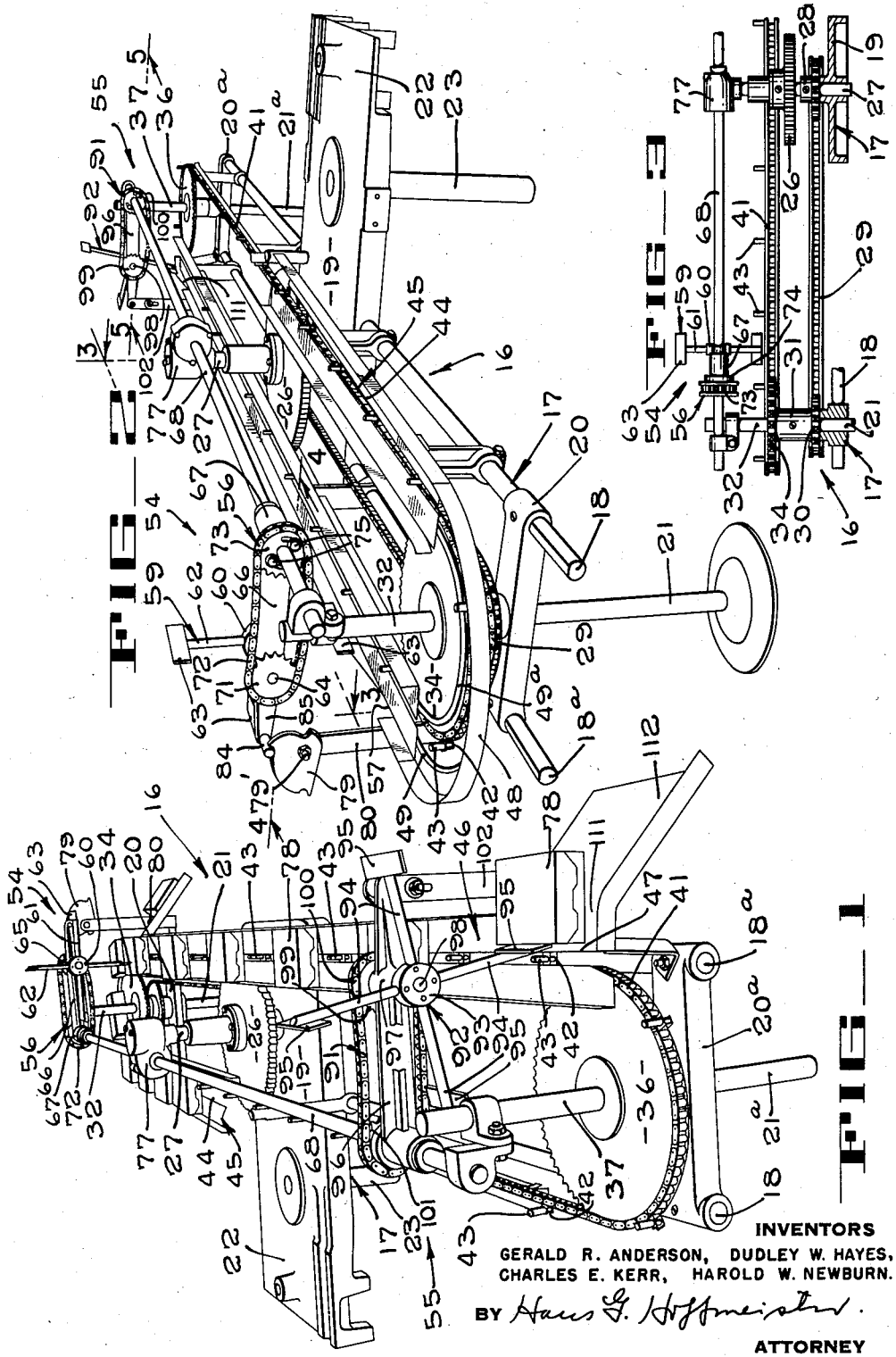

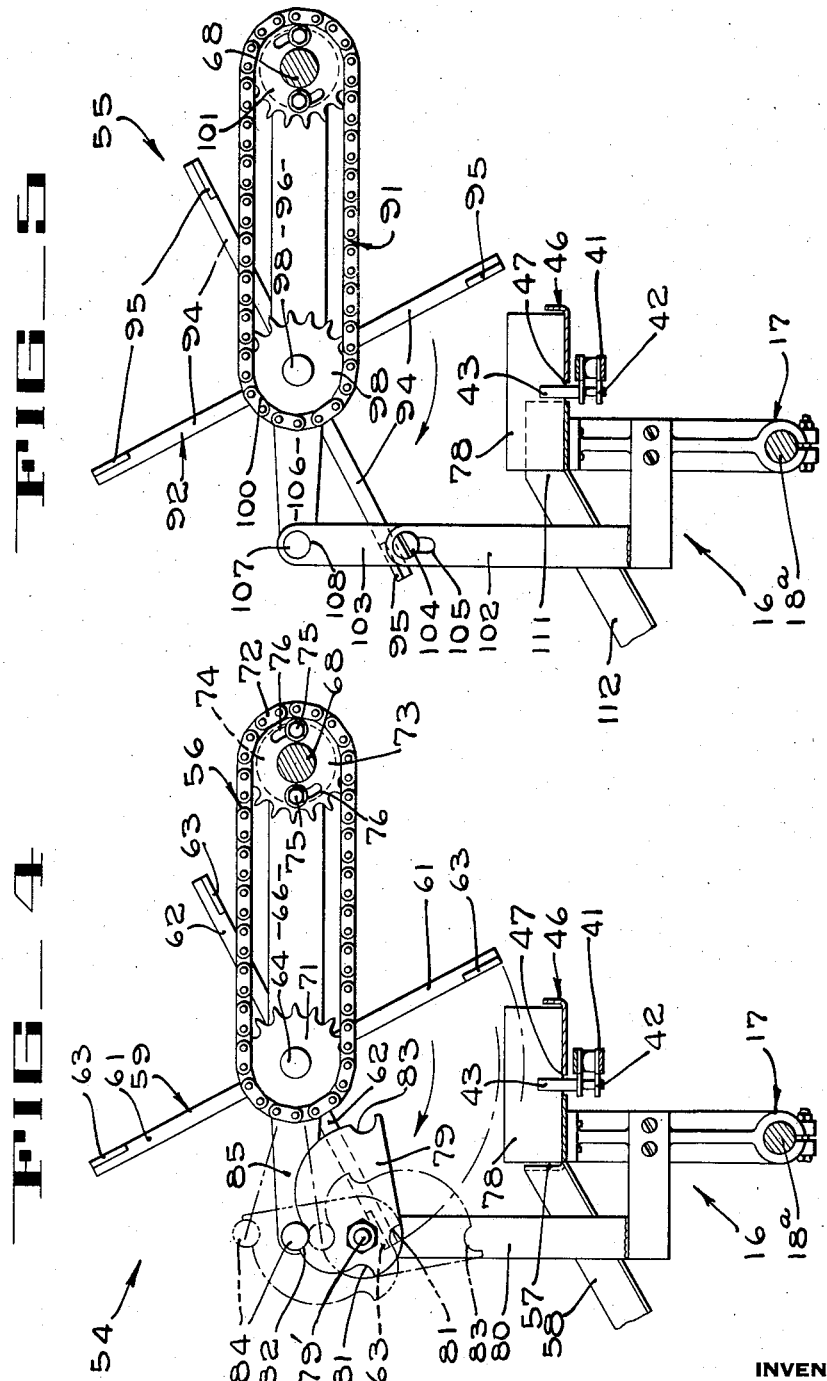

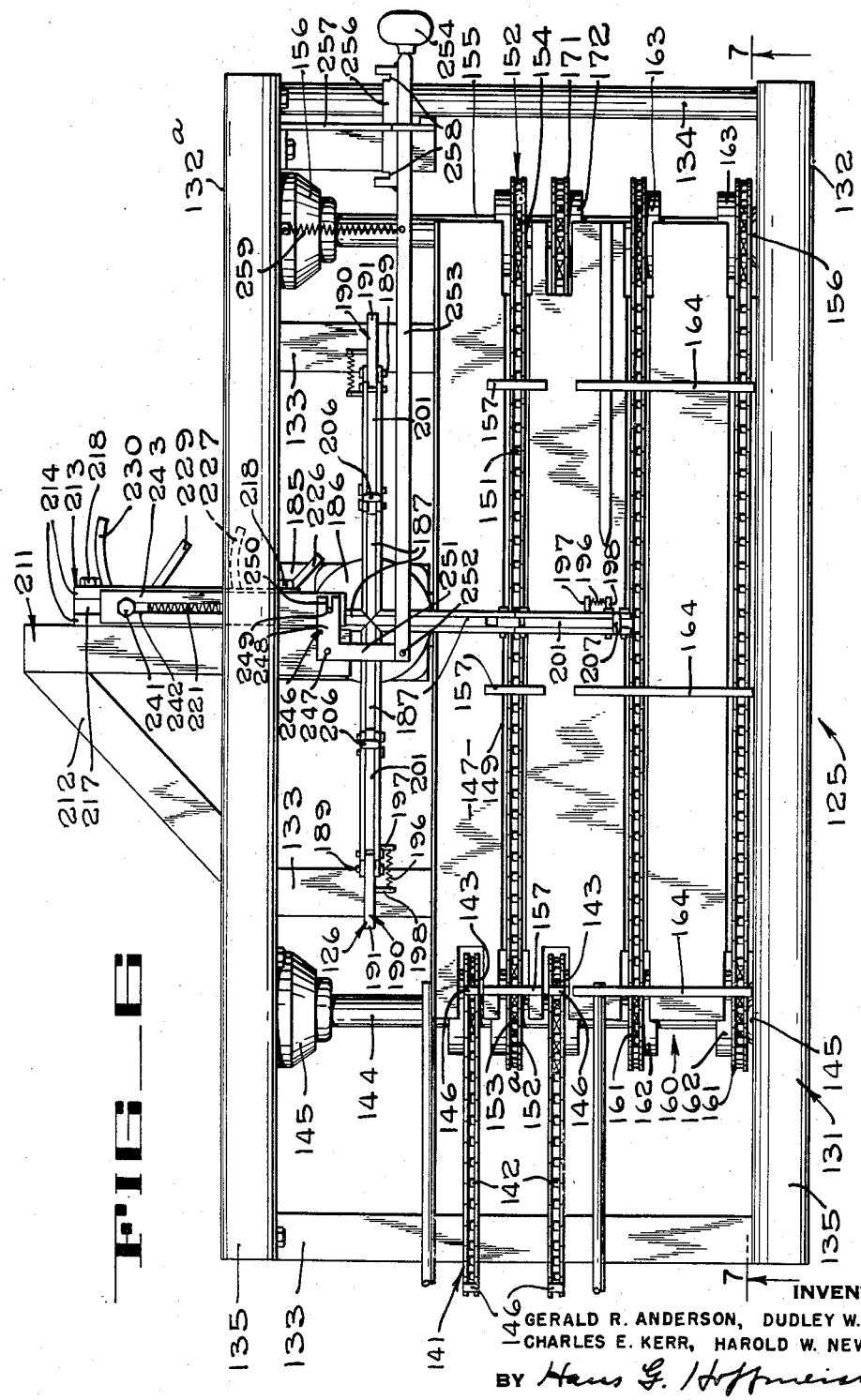

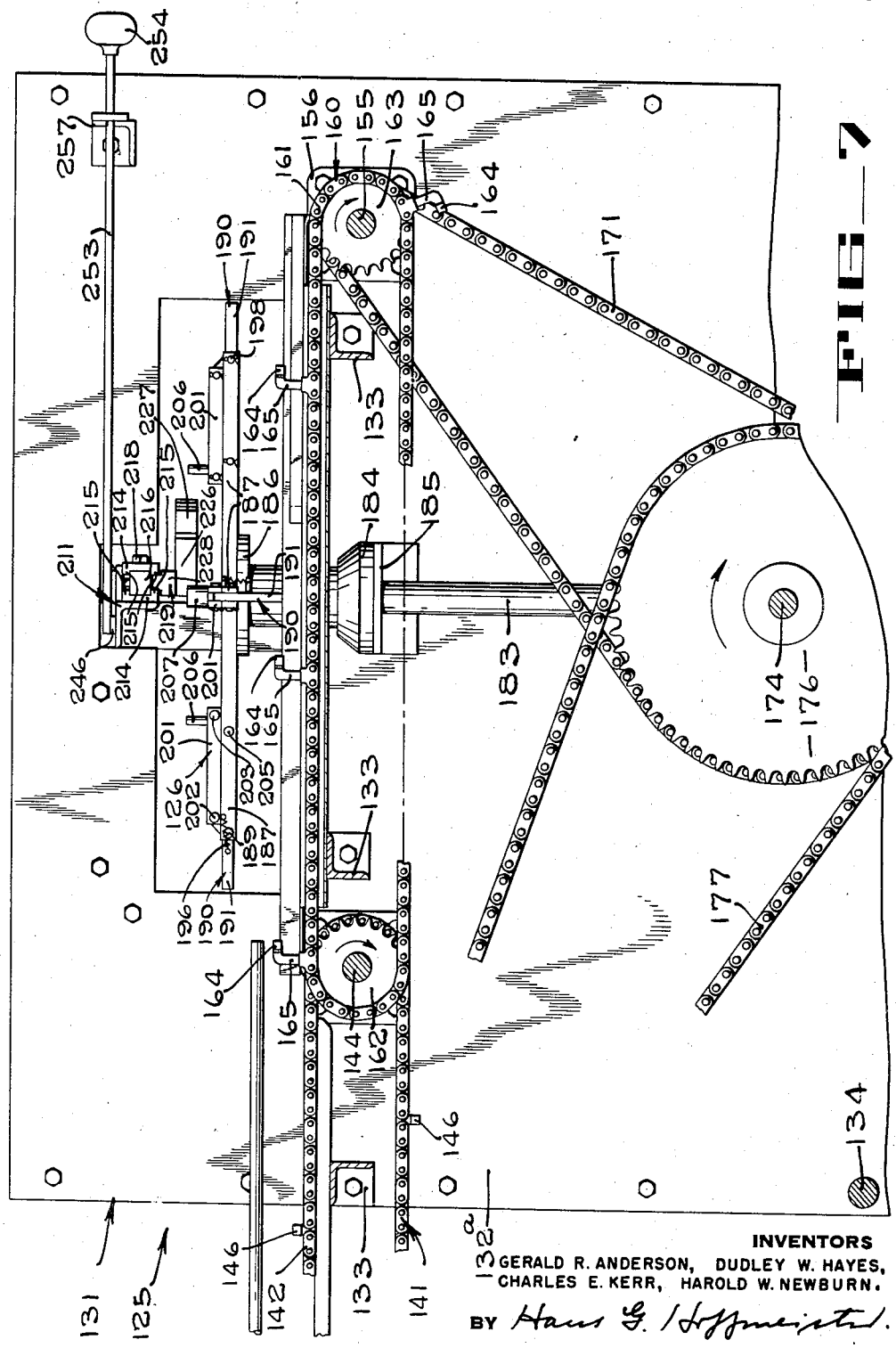

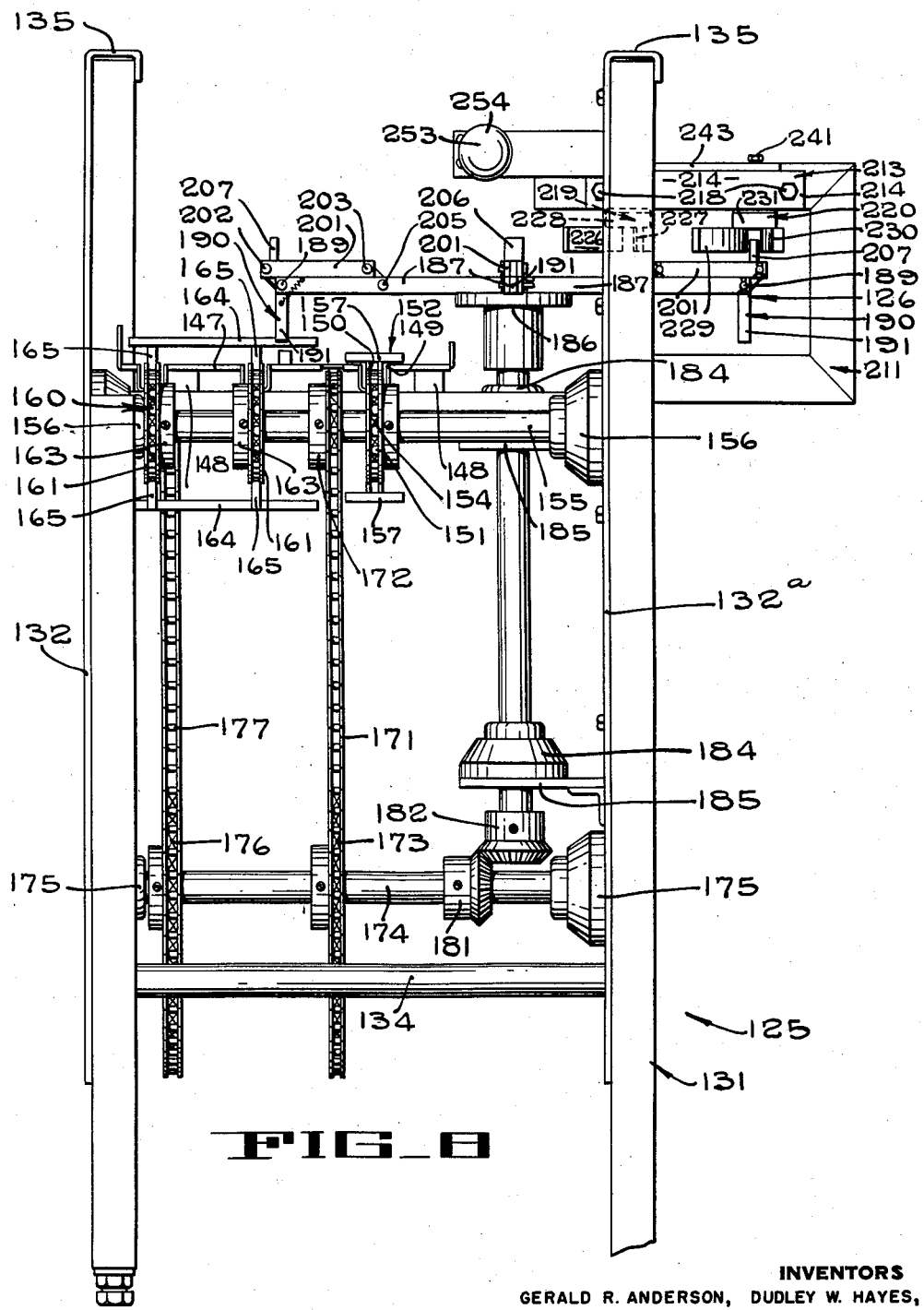

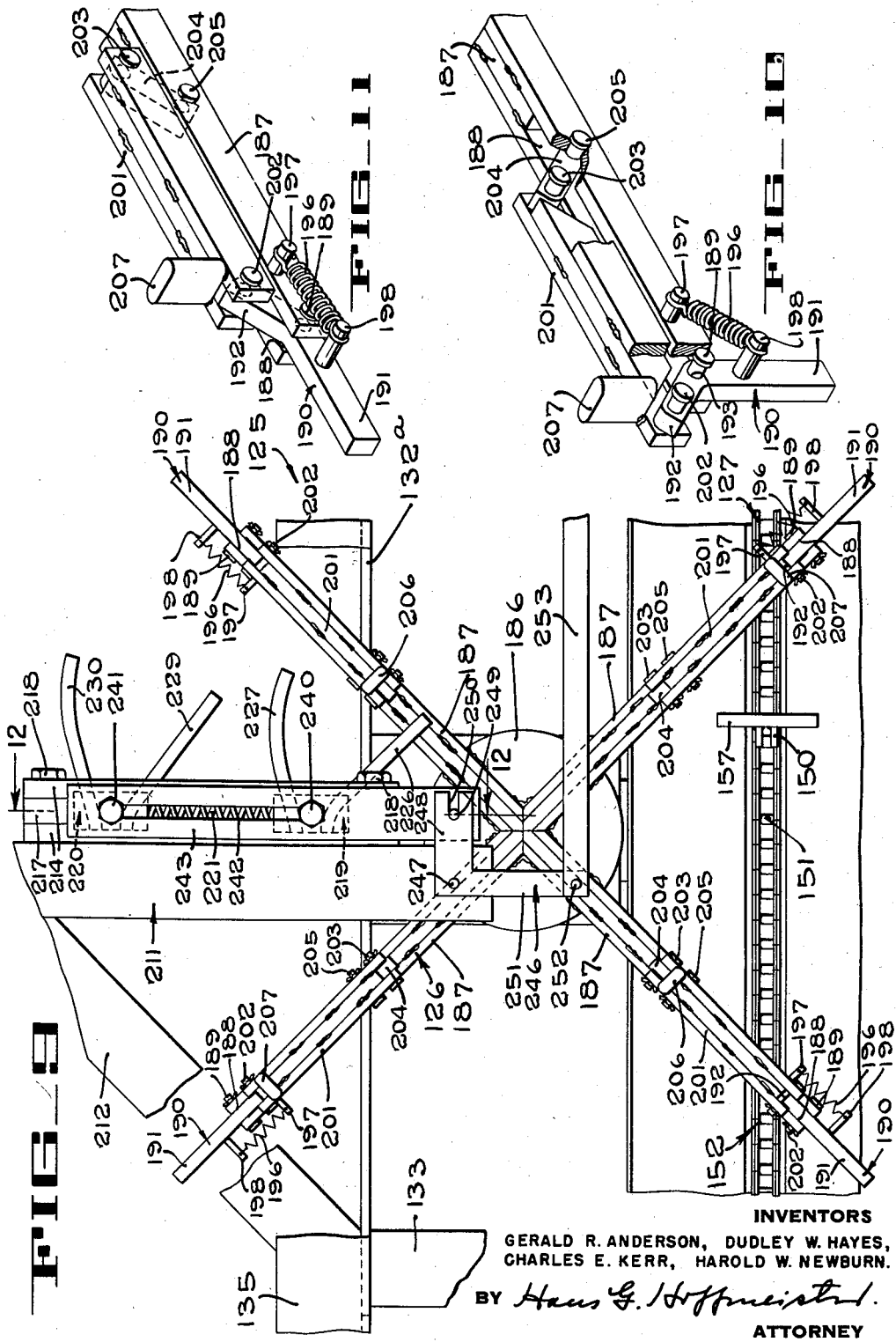

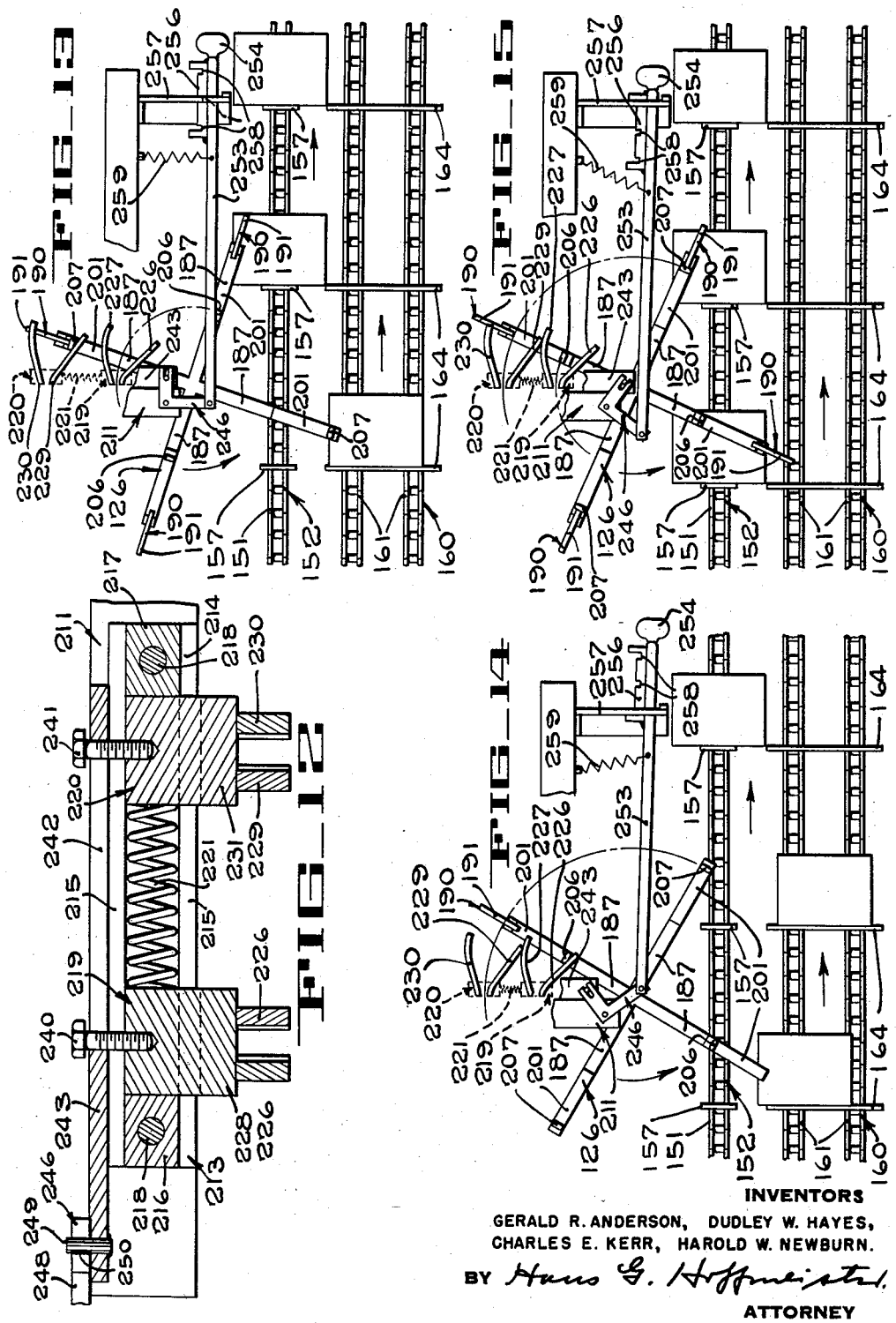

ARTICLE DISTRIBUTING MACHINE

Gerald R. Anderson, Campbell, and Dudley W. Hayes, San Jose, Calif., Charles E. Kerr, Hoopeston, Ill., and Harold W. Newburn, San Jose, Calif., assignors to Food Machinery and Chemical Corporation, San Jose, Calif., a corporation of Delaware Application June 24, 1954, Serial No. 438,964

15 Claims. (Cl. 198—31)

This invention relates to distributing conveyor systems.

An object of the invention is to provide a conveyor system adapted to receive a procession of articles in single file and to deliver them in separate lines to individual stations of the system.

Another object is to provide apparatus for distributing to each of a plurality of individual stations of a conveyor system, a predetermined number of the total number of articles supplied to the apparatus.

Another object of the invention is to provide mechanism for distributing articles between a plurality of receiving stations by intercepting some of the articles as they approach the apparatus on a conveyor and diverting the intercepted articles onto a branch conveyor leading to a first discharge station, while the other articles are permitted to continue undisturbed to a second discharge station.

Another object of the present invention is to provide an article distributing apparatus which is adjustable to vary the percentage of articles delivered thereby to each of a plurality of receiving stations.

Another object is to provide article distributing apparatus which is adjustable during operation to distribute a continuous supply of articles between two separate discharge sections of a conveyor system, or to effect delivery of all of the articles to either one of the discharge sections.

These and other objects and advantages of the invention will become apparent from the following description and the accompanying drawings, in which:

Figure 1 is a perspective of an article distributing apparatus incorporating the invention.

Figure 2 is a perspective of the apparatus of Fig. 1, viewed from the opposite end.

Figure 3 is a diagrammatic, vertical section taken along lines 3—3 of Fig. 2.

Figure 4 is a transverse vertical section taken along lines 4—4 of Fig. 2.

Figure 5 is a transverse vertical section taken along lines 5—5 of Fig. 2.

Figure 6 is a plan view of a modified form of article distributing machine embodying the invention.

Figure 7 is a longitudinal section taken along lines 7—7 of Fig. 6.

Figure 8 is an elevation of the machine of Figs. 6 and 7 as viewed from the right therein.

Figure 9 is an enlargement of a portion of Fig. 6, showing parts of the machine differently positioned.

Figure 10 is a detail perspective partly broken away, showing in article engaging position, one of the intercepting fingers of the machine of Fig. 6.

Figure 11 is a perspective similar to Fig. 10, but showing the finger in an alternative position.

Figure 12 is a detail view in vertical section taken along the lines 12—12 of Fig. 9.

Figures 13, 14 and 15 are schematic views showing the machine of Fig. 6 in three selectively adjusted arrangements.

The article distributing machine of the invention is designed to receive articles in a continuous procession and to distribute the articles between a plurality of discharge conveyors. For example, the distributing machine 16 illustrated in Figs. 1 to 5, inclusive, is adapted for use in conjunction with a carton closing machine (not shown) from which filled and closed cartons issue in such rapid succession that more than a single machine is required to perform the next successive step of processing the cartons, such as wrapping or labeling, at a rate adequate to keep pace with the closing machine. It is a function of the machine 16 to divide the output of a filled carton closing machine between two wrapping machines and thereby permit operation of the closing machine at full capacity.

The operative portions of the distributing machine 16 are carried by a frame 17 comprising two longitudinally extending bars 18 and 18a retained in spaced, parallel arrangement by a bed plate 19 rigidly secured to the bars 18 and 18a intermediately of their ends, and by transverse braces 20 and 20a secured to the bars 18 and 18a adjacent their ends. The machine 16 is supported adjacent its ends on pedestals 21 and 21a rigidly affixed to and extending downward from the braces 20 and 20a.

A lateral extension 22 of the bed plate 19, also equipped with a supporting pedestal 23, provide convenient means for supporting the carton closing machine whose output the machine 16 of the present invention is to distribute, as well as for positioning the two machines in such a manner that a constantly rotating gear (not shown) of the carton closing machine is disposed in meshing engagement with a large gear 26 rigidly secured to a vertical shaft 27 journaled adjacent its lower end in the bed plate 19. The shaft 27 carries a sprocket gear 28 (Fig. 3) which is connected by a chain 29 to a driven sprocket gear 30 which is one of two sprocket gears rigid with a sleeve 31 freely rotatable on a vertical spindle 32 which extends upward from the transverse brace 20 and which, therefore, conveniently is provided by an upward extension of the pedestal 21.

The other sprocket gear 34 carried by the sleeve 31 is in horizontal planar alignment with, and corresponds in both diameter and number of teeth to, a gear 36 journaled on a spindle 37 provided by an extension of the pedestal 21a above the transverse brace 20a.

An endless conveyor chain 41 trained around both sprockets 34 and 36 includes specially shaped links 42 (Figs. 2, 4 and 5) spaced at equal intervals throughout the length of the chain 41. Each of the special links 42 carries an upstanding pusher pin 43 adapted to enter and travel longitudinally of a slot 44 in the bottom of a horizontal conveyor channel 45 above one of the runs of the chain 41. The conveyor channel 45 extends from a position above the bed plate 19 where it is adapted to receive closed and filled cartons as they issue from the closing machine, to a position in transverse alignment with the spindle 32. Another parallel conveyor channel 46 above the opposite run of the chain 41 extends substantially the full length of the machine 16, and a longitudinal groove 47 in the bottom wall of the channel 46 extends throughout the entire length of the same. The ends of the two channels 45 and 46 adjacent the spindle 32 are interconnected by a semicircular outer guide strip 48 (Fig. 2) and two semicircular carton-supporting rods 49 and 49a which guide cartons from the channel 45 onto the channel 46.

Thus it may be seen that power derived from the operating mechanism of the carton closing machine is employed to actuate the conveyor chain 41, causing the carton propelling pins 43 sucessively to enter the slot 44 at the inlet end of the conveyor channel 45 above the bed plate 19 and to advance along the channel 45, thence around the spindle 32 while projecting upward between the carton supporting rods 49 and 49a and to enter and travel throughout the length of the slot 47 of the conveyor channel 46. Consequently, cartons received successively upon the conveyor channel 45 from the carton closing machine are advanced individually by the fingers 43 and in a continuous procession along both conveyor channels 45 and 46.

Means are provided at an intercepting station 54 for intercepting and diverting a preselected number of cartons delivered to the conveyor channel 45 while the remainder of the cartons is permitted to continue on to be discharged from the machine 16 at a second intercepting station 55. For this purpose a diverting mechanism 56 is arranged opposite an opening 57 (Figs. 2 and 4) in the outer side wall of the conveyor channel 46 adjacent the end of the same first encountered by the cartons. A gravity chute 58 inclines downward from the opening 57. The diverting mechanism 56 comprises a rotor 59 in the form of a hub 60 (Figs. 1 and 2) having four equally spaced arms 61 and 62 radiating therefrom. Two of the arms, say the opposed arms 61, are longer than the intervening arms 62, and each of the four arms 61, 62 carries a pusher plate 63 at its outer end. The rotor 59 is carried by a stub shaft 64 to which it is rigidly secured, and the stub shaft is journaled in a bearing 65 (Fig. 1) formed in a supporting arm 66. The arm 66 is provided with a second bearing 67 (Figs. 1, 2 and 3) journaled on a drive shaft 68 extending longitudinally of the machine 16 above the plane of the conveyor channels 45 and 46 and in such position that the bearing 65 for the rotor 59 is disposed above the conveyor channel 46, substantially in line with the opening 57 in the side wall thereof and with the axis of the stub shaft 64 horizontal, i. e., parallel to the conveyor. A sprocket gear 71 (Figs. 2 and 4) is rigidly secured to the stub shaft 64 on the opposite end thereof from the hub 60. The sprocket gear 71 is connected by a chain 72 with an aligned driving sprocket gear 73 which is carried by a head 74 (Fig. 3) rigidly secured to the drive shaft 68. The driving sprocket 73 is releasably fastened to the head 74 in selected position of rotational adjustment with respect thereto, by means of cap screws 75 (Fig. 4) extending through arcuate slots 76 in the gear 73 and threaded into the head 74.

The shaft 68 is adapted to be rotated in timed relation to the movement of the conveyor chain 41 by means of bevel gears (not shown) enclosed within a gear housing 77 at the upper end of the shaft 27 which is connected to the bevel gears so as to effect rotation of the shaft 68. The timing relationship between the shaft 68 and the conveyor chain 41 is determined by selection of appropriate gears for interconnecting the shafts 27 and 68, and is such that the shaft 68 turns through 90° in the time required for the conveyor chain 41 to move through a distance corresponding to the spacing between each two adjacent pusher pins 43.

In addition to such timing of the rotor 59 with relation to the speed of the conveyor chain, it is likewise important that these parts be positioned accurately with respect to each other. The arms 61, 62 of the rotor 59 should move across the conveyor channel 46 far enough in advance of every pusher pin 43 for the pusher plates 63 to clear the pins, but sufficiently close to the pins 43 to engage and deflect through the opening 57 cartons 78 being propelled by the pins. Such positioning of the rotor 59 with respect to the conveyor chain 41 is attained by turning the rotor 59 to the desired position with respect to the most closely approaching pusher pin 43 before the chain 72 is placed in meshing engagement with both sprockets 71 and 73. If necessary for most efficient operation, a finer adjustment of the segregating rotor 59 is obtainable by loosening the cap screws 75, turning the sprocket 73 with relation to the hub 74 as hereinabove described, and then tightening the cap screws 75, to clamp the sprocket 73 and head 74 together in adjusted rotation.

Since the bearing 67 is journaled on the drive shaft 68 the rotor-supporting arm 66 can remain stationary while the shaft 68 rotates. The outer end of the arm 66 on which the rotor 59 is mounted is supported at any one of three optional positions of elevational adjustment by a cam 79 pivotally mounted by a bolt 79' on a bracket 80 extending rigidly upward from the frame 17 of the machine 16 adjacent the opening 57 in the conveyor channel 46. The cam 79 is formed with three notches 81, 82 and 83 at progressively greater radial distances from the axis of the pivot bolt 79', and a pin 84 rigid with an extension 85 of the arm 66 is selectively receivable in any one of the notches 81, 82 and 83. The parts are so proportioned that when the pin 84 is seated in the notch 81 closest to the pivot bolt 79', thus supporting the arm 66 at the lowest of its three optional positions, all of the pusher plates 63 move in paths intersecting the path of cartons 78 moving on the conveyor channel 46. By removing the pin 84 from the closest notch 81, and turning the cam 79 to seat the pin 84 in the notch 83 at the greatest distance from the pivot bolt 79', the rotor 59 is supported at such an elevation that all of the pusher plates 63 travel in paths spaced above the path of cartons 78 moving on the conveyor channel 46; and when the pin 84 is seated in the notch 82 at an intermediate distance from the axis of the pivot bolt 79', the pusher plates 63 carried by the longer arms 61 intersect the path of cartons 78 on the conveyor channel 46 while the pusher plate 63 of the shorter arms 62 clear the said carton path, as indicated in Fig. 4.

A second diverting mechanism 91 is mounted in position above the opposite end of the conveyor channel 46 at the second intercepting station 55, and is of similar construction to the diverting mechanism 56 in that it includes a roor 92 having a hub 93 (Figs. 1 and 5) from which four equally spaced arms 94 radiate, each arm 94 having a pusher plate 95 at its outer end. The rotor 92 is rotatably supported by an arm 96 provided with a bearing 97 through which extends a stub shaft 98 carrying at one end of the same the hub 93 of the rotor 91. A sprocket gear 99 rigid with the other end of the stub shaft 98 is connected by a chain 100 with a driving sprocket gear 101 mounted rigidly on the drive shaft 68. All four arms 94 are of the same length, and therefore it is unnecessary to provide means for adjusting the arm 96 to more than one operating position. A bracket 102 extends rigidly upward from the frame 17 and carries at its upper end an extension 103 (Fig. 5) connected thereto by means of a screw 104 threaded to the lower end of the extension 103 and passing freely through a vertical slot 105 in the bracket 102. An extension 106 of the arm 96 carries a pin 107 pivotally seated in a hole 108 in the upper end of the bracket extension 103. Upon loosening the screw 104 it is possible to vertically adjust the extension 103, and with it the arm 96 so as to attain the optimum engagement between the pusher plates 95 and cartons 78 on the conveyor channel 46; and having once attained such optimum adjustment of the arm 96 and rotor 92, the screw 104 should be tightened to retain the parts in such adjusted arrangement.

The rotor 92 is positioned with respect to the pusher pins 43 at the conveyor chain 41 so as to cause a pusher plate 95 to move across the conveyor channel 46 a short distance in advance of each of the pusher pins 43. This assures that any carton 78 remaining on the conveyor channel 46 when the carton reaches the second intercepting station 56, will be diverted and pushed through an opening 111 in the outer side wall of the conveyor channel 46 in alignment with the pusher plates 95 of the rotor 92, and onto a gravity conveyor 112 sloping downward from the opening 111. Such timing of the rotor 92 is attained by turning the rotor 92 so as to dispose one of the pusher plates 95 in the desired position with respect to the most closely approaching pusher pin 43, before placing the chain 100 in meshing engagement with both sprockets 99 and 101.

In practical operation, the machine 16 may be employed to distribute to two independently operating carton wrapping machines the filled and closed cartons issuing from a single carton closing machine. Such arrangement permits operation at full capacity of a carton closing machine, and likewise of a carton filling machine preceding the closing machine in a production line, in spite of the fact that cartons ordinarily pass through the filling and closing machine at a rate exceeding the capacity of a carton wrapping machine.

The filled and closed cartons 78 are discharged from the closing machine onto the conveyor channel 45 in a continuous procession, and the conveyor chain 41 is operated at such a rate that the number of pusher pins 43 passing any given point on the channel 45 per unit of time corresponds to the number of cartons received during that same time interval. Accordingly, one carton 78 is deposited onto the channel 45 in advance of each of the pusher pins 43 with the result that the cartons are individually propelled along the channel 45 in a continuous procession, although spaced apart a substantial distance, as shown in Fig. 1.

The cartons are thus advanced along the conveyor channel 45 to the guide strip 48 and the rods 49 and 49a, which cooperate with the conveyor chain 41 and fingers 43 to convey the cartons from the channel 45 onto the channel 46 along which the cartons move to the first discharge station 54, where the deflecting rotor 59 is located.

As hereinabove described, the rotor 59 turns at such a rate that an arm 61 or 62 of the rotor sweeps across the conveyor channel in advance of each of the pusher fingers 43. If the cam 79 is disposed with its intermediate notch 82 uppermost, as illustrated in full lines in Fig. 4, each of the pusher plates 63 of the two longer arms 61 will engage a carton 78 and deflect the same laterally from the channel 45, through the opening 57, and onto the chute 58. Inasmuch as the long arms 61 and the short arms 62 are disposed alternately, the described arrangement of the cam 79 with the pin 84 in the intermediate notch 82, effects interception of every second carton 78 moving on the conveyor channel 46 and delivery of the intercepted cartons to the chute 58. However, the shorter arms 62 pass freely over the cartons in alignment therewith on the channel 46, and the cartons thus cleared pass through the deflecting station 54 without being disturbed in their progress along the channel 46 to the second discharge station 55 where the deflecting rotor 92 operates to intercept all cartons remaining on the channel 46 and to remove the same to the chute 111. With the cam 79 in its intermediate position, therefore, the machine 16 operates to divide the cartons which it receives, equally between the two discharge chutes 58 and 111, each of which may be arranged to transport the cartons received thereby to a separate, independently operating wrapping machine.

However, circumstances might arise making it desirable to interrupt delivery of cartons to one of the chutes, and discharge all cartons received by the machine 16 onto the other chute. By turning the cam 79 clockwise as viewed in Fig. 4 from the position therein illustrated, until the pin 84 seats in the notch 81, the arm 66 will be lowered sufficiently for the plates 63 of the shorter arms 62, as well as those of the longer arms 61, to engage cartons 78 on the channel 46, thus causing all of the cartons 78 to be removed from the channel 46 at the first deflecting station 54 onto the chute 58 and delivered thereby to one of the wrapping machines.

Alternatively, by turning the cam 79 counterclockwise from its Fig. 4 position, the pin 84 may be seated in the notch 83, raising the arm 66 to a position wherein the pusher plates 63 of all of the arms 61 and 62 clear the cartons. Hence this arrangement permits all cartons 78 to pass undisturbed through the deflecting station 54, so that all cartons reach the second deflecting station 55, where they are discharged onto the chute 112 which delivers them to the other wrapping machine.

Figures 6 to 15, inclusive, illustrate another form of apparatus incorporating the principles of the present invention. This article distributing machine 125 comprises a single diverting rotor 126 mounted for rotation about a vertical axis adjacent the delivery end of a conveyor 141 by which cartons are delivered to the machine 125 to be divided between two discharge stations.

The frame 131 of the machine 125 includes two opposed side plates 132 and 132a rigidly maintained in spaced, parallel arrangement by a plurality of horizontally aligned angle members 133 and spacer rods 134. Stiffening flanges 135 are formed on the upper edges of the side plates 132 and 132a.

A continuous procession of cartons are delivered to the distributing machine 125 by the conveyor 141 comprising two spaced, parallel conveyor chains 142 each of which is trained around a sprocket 143 (Fig. 6) carried by a horizontal shaft 144 journaled in bearings 145 mounted on the side plates 132 and 132a. Since the delivery conveyor 141 receives its motivating power from the same source as that which actuates the distributing machine 125, the sprockets 143 are rigidly affixed to the shaft 144 to be rotated thereby. The two chains 142 of the delivery conveyor 141 carry aligned flights 146 at equally spaced intervals throughout the length of the chains so as to provide positive drive for cartons conveyed to the distributing machine 125 and to assure equal spacing of the cartons.

The delivery conveyor 141 discharges the cartons successively onto a horizontal plate 147 supported by upstanding brackets 148 (Fig. 8) carried by some of the transverse angle members 133. The plate 147 has therein a longitudinally extending slot 149 adapted to accommodate extensions 150 (Figs. 8 and 9) of specially shaped links disposed at equally spaced intervals throughout the length of the chain 151 of a receiving conveyor 152, which at one end of the conveyor chain 152 is trained around a sprocket 153 (Fig. 6) affixed to the shaft 144 between the two sprockets 143 of the delivery conveyor 141. At the opposite end of the receiving conveyor 152 the chain 151 is trained around a sprocket 154 rigid with a shaft 155 disposed in spaced, parallel relation to the shaft 144, and journaled in bearings 156 mounted on the side plates 132 and 132a.

Each of the link extensions 150 of the chain 151 carries a transversely extending flight 157 adapted to advance along the plate 147 in a position spaced slightly above the same (Fig. 8). The chains 151 and 142 are so disposed with respect to each other that as each flight 157 of the chain 151 completes its travel in a semicircular path around the sprocket 153, it assumes a position between two associated flights 146 of the conveyor chains 142 as clearly shown in Fig. 6. Consequently, each flight 157 takes a position immediately behind a carton being delivered by the chains 142 onto the plate 147 with the result that as the flights 146 of the chains 142 drop below the level of the plate 147, the carton is transferred to a flight 157 of the receiving conveyor 152 to be advanced thereby longitudinally along the plate 147.

A second receiving conveyor 160 disposed parallel to and closely adjacent the receiving conveyor 152, includes two spaced, parallel chains 161 each of which is trained around sprockets 162 and 163 rigid, respectively, with the shafts 144 and 155. The conveyor 160 is provided with flights 164 corresponding in number, and arranged oppositely to the flights 157 of the conveyor 152. In the case of the conveyor 160, however, the flights 164 are considerably wider than their companion flights 157, and are carried by both chains 161 on which they are mounted by extension 165 (Figs. 7 and 8) of specially shaped links disposed at equally spaced intervals throughout the length of chains 161.

A chain 171 is trained around two sprockets 172 and 173 which are rigid, respectively, with the shaft 155 and a countershaft 174, the latter of which is journaled in bearings 175 mounted on the side plates 132 and 132a. The countershaft 174 is rotated at suitable uniform speed by a sprocket 176 connected by a chain 177 to a driving motor (not shown), thus establishing a power drive for actuating in unison all three of the conveyors 141, 152 and 160.

A bevel gear 181 is also rigid with the countershaft 174, and meshes with another bevel gear 182 which is rigid with a vertical shaft 183 (Figs. 7 and 8) whose journaling bearings 184 are mounted on brackets 185 extending inward from the side plate 132a. At its upper end the shaft 183 extends beyond the plane of the plate 147 and supports the hub 186 of the distributing rotor 126 which has four uniform, horizontal arms 187 extending radially therefrom at equal angular spacing about the axis of the hub 186.

Each of the arms 187 is bifurcated at its outer end to define a vertical slot 188 (Figs. 9, 10 and 11) across which extends a pin 189 having a carton-deflecting finger 190 pivotally mounted thereon. Each deflecting finger 190 includes a lower portion 191 and an upper portion 192 extending therefrom at an obtuse angle. The pivot pin 189 extends through a hole 193 (Fig. 10) formed in the finger 190 at the juncture of the portions 191 and 192 thereof. Associated with each finger 190 is a spring 196 under tension between a pin 197 on the arm 187 and a pin 198 on the finger 190. The pins 197 and 198 are so positioned that the spring 196 moves past the axis of the pivot pin 189 as the finger 190 rotates from the position in which its lower portion 191 extends vertically downward from the outer end of its supporting arm (Fig. 10) to a raised position in which the lower portion 191 extends horizontally outward from the arm (Fig. 11). Therefore, the spring 196 functions as a toggle adapted to yieldingly retain the finger 190 either in its lower opertive position or in its raised inoperative position.

Movement of each deflecting finger 190 to and from operating position is effected by an adjusting bar 201 overlying the outer end of the associated rotor arm 187. The outer end of the bar 201 is pivotally connected by a pin 202 to the upper portion 192 of the pin 190; and the inner end of the bar is pivotally connected by a pin 203 to the upper end of a link 204 whose lower end is pivoted to the associated arm 187 by a pin 205. The distance between the axes of the pins 189 and 202 is equal to the distance between the axes of the pins 203 and 205, and the plane including the axes of the pins 189 and 202 is parallel to the plane including the axes of the pins 203 and 205. Consequently, the bar 201 is capable of translatory movement in an arcuate path optionally to an outer position (Fig. 10) or to an inner position (Fig. 11) in either of which positions the bar 201 rests on the top surface of the associated arm 187. When one of the bars 201 is moved to its outermost position, the upper portion 192 of the associated deflecting finger 190 is carried outward, swinging the finger 190 about the axis of its pivot pin 189 and disopsing the lower portion 191 of the finger 190 in a position extending vertically downward where it is retained against accidental displacement by the spring 196. Inward motion of the bar 201 results in turning the finger 190 in the opposite direction, disposing the lower portion 191 of the pin in a raised position extending horizontally outward beyond the end of the rotor arm 187.

The adjusting bar 201 carried by each of two opposed rotor arms 186 is provided with an upstanding lug 206 adjacent the inner end of the bar 201, and the adjusting bar 201 of each of the other two opposed arms 186 carries a lug 207 similar to the lugs 206 but disposed adjacent the outer end of the bar 201. Accordingly, the lugs 206 at lesser radial distance from the axis of rotation of the rotor 126, and the lugs 207 at greater radial distance from that axis, are disposed alternately with respect to each other around the rotor 126.

As best shown in Fig. 6, the rotor 126 is so disposed, and the arms 187 thereof are of such length, that as the rotor 126 turns, the arms 187 successively sweep completely across the first receiving conveyor 152 and part way over the second receiving conveyor 160, and at such a height that if any of the fingers 190 is disposed in its lower, operating position, it intersects the path of cartons moving on the conveyor 152. The rotor 126 is synchronized with, and its arms 187 are positioned with relation to, the flights 157 of the conveyor 152, by appropriate selection and relative positioning of the bevel gears 181 and 182 and the sprockets 172 and 173, so that one of the fingers 190 sweeps across the conveyor 152 a short distance in front of every conveyor flight 157. Consequently, in normal operation of the machine 125, whenever a finger 190 is in operating position during its sweep across the conveyor 152 toward the conveyor 160, the finger will intercept a carton advancing on the conveyor 152 and deflect it laterally onto the second receiving conveyor 160 by which cartons thus intercepted and deflected will be discharged from the machine 125 at a location different from the point of discharge of cartons cleared by raised fingers 190 and thus permitted to remain on the first receiving conveyor 152. Thus it may be seen that cartons delivered to the machine 125 in a single lane are discharged from the machine in two lanes.

Means are provided for arranging the deflecting fingers 190 so as to effect discharge of cartons from the machine 125 by either or both of the conveyors 152 and 160, according to any one of three optional procedures. As shown in Figs. 6, 8 and 9, a bracket 211, strengthened by a brace 212, extends laterally outward from the side plate 132a to provide rigid support for a horizontal guide track 213. The track 213 is arranged in a position above the path of the arms 187 of the rotor 126, substantially in alignment with the axis of the rotor 126. The track 213 is defined by two opposed channels 214 (Fig. 7), each of which is disposed with its flanges 215 directed toward and in horizontal alignment with the flanges 215 of the other channel 214. Inner and outer spacer blocks 216 and 217, respectively, are seated between the channels 214 at the ends of the track 213, and cap screws 218 extend through both channels 214 and the blocks 216 and 217 and are threaded into the bracket 211 to rigidly mount the track 213. Inner and outer slide blocks 219 and 220, respectively (Figs. 9 and 12) are slidably engaged between the channels 214, and are urged apart by a compression spring 221, so that normally the slide blocks 219 and 220 occupy their positions of greatest separation, wherein they both bear against the associated spacer blocks 216 and 217.

Inner and outer camming fingers 226 and 227 are welded to the under surfaces of a downward extension 228 of the inner slide block 219, and a similar pair of camming fingers 229 and 230 are welded to the under surface of a downward extension 231 of the outer slide block 220. As best shown in Figs. 6, 9, 13, 14 and 15, the camming fingers 226, 227 and 229, 230 of both pairs diverge from each other in the direction from their respective supporting slide blocks 219, 220 opposite the direction in which the arms 187 approach the track 213 when the rotor 126 turns.

The inner set of camming fingers 226 and 227 are so arranged that the inner upstanding lugs 206 can pass freely therebetween when the inner slide block 219 is in its inner extreme of movement (Figs. 12 and 13), provided the lugs 206 are likewise at their innermost positions, i. e., with their associated deflecting fingers 190 raised to inoperative position. Moreover, due to the inclined position of the outer camming finger 227 of the inner slide block 219, with respect to the path followed by the lugs 206 as they approach the finger 227, when either lug 206 is at its outer position, as the lug 206 approaches the finger 227 (still assuming the inner slide block 219 to be at its innermost position) the lug 206 will be cammed inward by the finger 227 as the lug passes between the fingers 226 and 227, raising the associated deflecting finger 190 to inoperative position. It is evident, therefore, that so long as the inner slide block 219 remains at its innermost position, both inner lugs 206 will remain at their inner positions with their associated deflecting fingers 190 raised to inoperative position.

On the other hand, so long as the outer slide block 220 remains at its outermost position (Fig. 12 and 13) the outer upstanding lugs 207 will pass freely between the camming fingers 229 and 230 provided the lugs 207 likewise are at their outermost position (Fig. 10) wherein their associated deflecting fingers 190 are disposed in downwardly extending or operative position; but if either of the outer upstanding lugs 207 is at its inner position (Fig. 11) as it approaches the slide block 220, that inwardly disposed lug 207 will encounter the camming finger 229 and by it be cammed outward as it passes between the fingers 229 and 230. Here again, therefore, it is evident that so long as the outer slide block 220 remains at its outermost position the outer lugs 207 likewise will remain at their outermost positions wherein their associated deflecting fingers 190 extend downward in their operating positions.

Means operable without requiring stopping the apparatus are provided for shifting either of the slide blocks 219 or 220 from its position of maximum separation from the other slide block. Cap screws 240 and 241 rigid with the slide blocks 219 and 220 extend through a slot 242 in a shifter plate 243 overlying the track 213. The length of the slot 242 is such that the cap screws 240 and 241 bear against both ends of the slot 242 (Fig. 12) when the two slide blocks 219 and 220 are at their positions of maximum separation. Consequently, by sliding the shifter plate 243 outward along the track 213 the inner cap screw 240, and with it the inner slide block 219, can be slid outward against the compression of the spring 221 and without disturbing the outer slide block 220. Conversely, by sliding the shifter plate 243 inward, the outer cap screw 241 and with it the shifter block 220 can be slid inward against the compression of the coil spring 221 and without disturbing the inner slide block 219.

A bell cank 246 (Figs. 6, 9, and 10) is pivoted by a pin 247 to the bracket 211. One leg 248 of the bell crank 246 extends from the pivot 247 to a position overlying the inner end of the shifter plate 243 to which it is operatively connected by a pin 249 rigid with the plate 243 and slidably seated in a slot 250 in the bell crank leg 248. The other leg 251 of the bell crank 246 is connected by a pivot pin 252 to one end of a rod 253, whose other end is provided with a knob 254 and is located in a position conveniently accessible to an operator stationed near the delivery end of the machine 125. The rod 253 and a notched plate 256 rigid therewith, extend through an aperture (not shown) in a supporting bracket 257 adjacent the outer end of the rod 253 and are adapted to be slid longitudinally so as to dispose any one of three notches 258 selectively in registry with an edge (not shown) of the said aperture. A coil spring 259 under tension between the rod 253 and the side plate 132a urges the rod 253 and plate 256 toward the said edge of the bracket 257 so as to releasably seat the edge in a selected one of the notches 258 and thus retain the rod 253 in any one of three optional positions of longitudinal adjustment.

The arrangement of the bell crank 246 is such that when the rod 253 is in an intermediate position wherein the edge of the bracket 257 is seated within the intermediate notch 258, as shown in Figs. 6 and 13, the shifter plate 243 likewise is in an intermediate position permitting the spring 221 to dispose both the inner and outer slide blocks 219 and 220 in their positions of maximum separation, bearing against their associated spacer blocks 216 and 217, respectively. This is the arrangement of the slide blocks 219 and 220 hereinabove described which effects disposing in operative position the deflecting fingers 190 associated with the adjusting bars 201 having the upstanding lugs 207 at their outer ends, while the other two deflecting fingers 190 are disposed in raised or inoperative position. Accordingly, when the control rod 253 is in the described intermediate position each alternate carton delivered onto the receiving conveyor 152 will be intercepted by a finger 190 and pushed laterally from the first receiving conveyor 152 onto the second receiving conveyor 160 in the manner hereinabove described.

By pushing the rod 253 inward, or to the left, as viewed in Figs. 6 and 9, until an edge of the bracket 257 seats within the outermost notch 258 (Fig. 15), the bell crank 246 is rotated clockwise and the shifter plate 243 is drawn inward. Upon such motion of the shifter plate 243 the inner slide block 219 remains motionless since it already is prevented from further inward motion by its abutment against the inner spacer block 216. The plate 243 merely slides past the cap screw 240, with the associated end of the slot 242 moving inward away from the stationary cap screw 240. However, since the opposite end of the slot 242 already engages the cap screw 241 the described inward motion of the shifter plate 243 is accompanied by coextensive inward motion of the outer slide block 220 which shifts the outer camming fingers 229 and 230 from their outermost position (Figs. 9 and 13) to an inner position (Fig. 15).

When so arranged the inner lugs 206 will continue to pass freely between the deflecting fingers 226 and 227 inasmuch as the inner block 219 has remained undisturbed. But the two outer lugs 207 will successively engage the inwardly displaced camming finger 230 and by it be moved inward, carrying with them the associated deflecting fingers 190 to their upper, inoperative positions corresponding to the position already occupied by each of the other two deflecting fingers 190. Consequently, although the rotor 126 will continue to rotate, none of the cartons advancing along that conveyor will be intercepted, and all cartons will continue uninterruptedly on the conveyor 151 to be discharged from the machine at the location served by the conveyor 151.

By pulling the rod 253 outward until the edge of the bracket 257 again seats within the intermediate notch 258, the bell crank 246 is rotated clockwise, permitting the outer slide block 220 to return to its outermost position. Upon the next succeeding rotation of the rotor 126 following such adjustment of the control rod 253 to its intermediate position the two outer lugs 207 will successively engage the camming finger 229, and by it be returned to their outer position, causing the two associated deflecting fingers 190 to be turned down to their operating position. Upon continued rotation of the rotor 120, the lugs 207 will pass freely between the camming fingers 229 and 230, permitting the associated deflecting fingers 190 to remain in position to deflect each alternate carton from the conveyor 152 onto the conveyor 160. Consequently, half the cartons received by the machine 125 again will be discharged therefrom on the conveyor 152, and the other half on the conveyor 160, permitting each of two wrapping machines to receive half of the cartons delivered to the distributing machine 125.

If the control rod 253 is pulled from its intermediate position, outward far enough to seat an edge of the bracket 257 in the innermost notch 258 of the plate 156, the shifter plate 243 is pushed outward as indicated in Fig. 14, leaving the outer slide block 220 and the camming fingers 229 and 230 undisturbed, but displacing outwardly the inner slide block 219 and camming fingers 226 and 227. Such motion of the camming finger 226 places it in the path of the inner lugs 206, as clearly shown in Fig. 14, so that during the next succeeding rotation of the rotor 126 the two inner lugs 206 will successively engage the camming finger 227 and by it be moved outward, thereby turning the two associated deflecting fingers 190 down to their operating positions corresponding to the position already occupied by the other two deflecting fingers 190. With all four of the deflecting fingers 190 thus disposed in operating position, all cartons approaching the rotor 126 on the conveyor 152 will be diverted to the conveyor 160 to be discharged by the latter.

Upon return of the control rod 253 to its intermediate position, the outer slide block 220 and camming fingers 229 and 230 will remain undisturbed, permitting two of the four deflecting fingers 190 to remain in operating position. The inner slide block 219, however, will be permitted to return to its innermost position, causing the camming finger 227 to move into the path of the inner lugs 206, so that during the next succeeding rotation of the rotor 126, both lugs 206 will be moved inward, effecting raising of the associated two deflecting fingers 190 to their inoperative position. Hence, half of the cartons again will be permitted to remain on the first conveyor 152 while the other half of the cartons will be deflected onto the second conveyor 160, thus dividing equally the total number of cartons delivered to the machine 125.

While we have shown and described preferred embodiments of our invention, it is to be understood that the invention is capable of further modification and variation without departing from the spirit and scope thereof as defined in the claims appended hereto.

Having thus described our invention, what we claim and desire to protect by Letters Patent is:

1. Apparatus for distributing articles comprising a primary conveyor, a secondary conveyor contiguous thereto, adjustable means for diverting articles advancing on the primary conveyor and sliding the same onto the second conveyor, means operable while the apparatus is in operation for adjusting the diverting means to article engaging position or to article clearing position, and means for releasably retaining the diverting means in article-engaging position or in article clearing position through more than a full operating cycle of the diverting means.

2. Apparatus for distributing articles comprising primary and secondary conveyors, a rotor rotatably mounted adjacent one of the conveyors, means for uninterruptedly turning the rotor, upwardly and downwardly adjustable article diverting means carried by the rotor in position to sweep over the primary conveyor, and means for selectively retaining the diverting means in a lower, article-engaging position or in an upper, non-engaging position throughout at least a complete revolution of the rotor.

3. Distributing apparatus comprising a supply conveyor adapted to advance at uniform intervals articles to be distributed, a rotor rotatably mounted adjacent the conveyor, means for constantly turning the rotor in timed relation to the conveyor, upwardly and downwardly adjustable article diverting means carried by the rotor in position to sweep over the conveyor, and means for retaining the diverting means optionally in a lower, article-engaging position, or in an upper, non-engaging position.

4. Distributing apparatus comprising a supply conveyor adapted to advance at predetermined intervals articles to be distributed, a rotor rotatably mounted adjacent the conveyor, means for positively connecting the rotor to the conveyor for rotation in timed relation thereto, article diverting means carried by the rotor, said diverting means being selectively movable to article-engaging position with respect to the conveyor or to non-engaging position, means adjustable during rotation of the rotor for retaining the diverting means in one of said positions, and means for disabling said retaining means.

5. Distributing apparatus comprising a supply conveyor adapted to advance at predetermined intervals articles to be distributed, a rotor rotatably mounted adjacent the conveyor, means for turning the rotor in timed relation to the conveyor, article diverting means carried by the rotor, said diverting means being selectively movable to article-engaging position with respect to the conveyor or to non-engaging position, means adjustable during rotation of the rotor for selectively retaining the diverting means optionally in either of said positions, and means for disabling said retaining means.

6. Distributing apparatus comprising a supply conveyor adapted to advance at predetermined intervals articles to be distributed, a rotor rotatably mounted adjacent the conveyor, means for turning the rotor in timed relation to the conveyor, a plurality of article diverters carried by the rotor in position to sweep transversely of the conveyor, said diverters being adjustable toward and away from the conveyor, releasable means for indefinitely retaining a selected one of said diverters in a path wherein it engages articles on the conveyor while another of said diverters remains in a position where it clears the articles on the conveyor, and means for disabling said retaining means.

7. Distributing apparatus comprising a supply conveyor adapted to advance at predetermined intervals articles to be distributed, a rotor rotatably mounted adjacent the conveyor, means for turning the rotor in timed relation to the conveyor, a plurality of article diverters carried by the rotor in position to sweep transversely of the conveyor, said diverters being adjustable toward and away from the conveyor, and selectively operable means for indefinitely retaining said diverters in positions wherein all of the diverters move in paths intersecting the path of articles on the conveyor, or in positions wherein at least one of the diverters moves in a path clearing said article path while another of the diverters intersects the article path, or in positions wherein all of the diverters move in paths clearing said article path.

8. Distributing apparatus comprising a first conveyor for advancing articles to be distributed, a second conveyor arranged adjacent the first conveyor for receiving articles from said first conveyor, and transfer means including a rotor rotatably mounted adjacent said conveyors, means for turning the rotor in timed relation to said first conveyor, a plurality of arms carried by the rotor in position to sweep over the first conveyor to deflect articles from the same onto the second conveyor, article engaging means movably carried by each arm, adjusting means movably mounted on each arm and operatively associated with the associated article engaging means for adjusting the same to and from operative position in response to movement of the adjusting means on the arm, and means engageable by the adjusting means as the rotor turns for moving each adjusting means on its associated arm.

9. Distributing apparatus comprising a first conveyor for advancing articles to be distributed, a second conveyor arranged adjacent the first conveyor, and transfer means including a rotor rotatably mounted adjacent said conveyors, means for turning the rotor in timed relation to the first conveyor, a plurality of arms carried by the rotor in position to sweep over the first conveyor to direct articles from the same onto the second conveyor, article engaging means movably mounted on each arm, adjusting means movably carried by each arm and operably connected to the associated article-engaging means to move the same to operative position in response to movement of the adjusting means in one direction and to move the article engaging means to inoperative position in response to movement of the adjusting means in another direction, toggle means for yieldably retaining each of said article engaging means in either of said positions, and means engageable by each adjusting means as the rotor turns for moving the adjusting means in either of said directions.

10. Article distributing apparatus comprising a first conveyor, a second conveyor arranged adjacent the first conveyor, and transfer means including a rotor rotatably mounted adjacent said conveyors, means for constantly turning the rotor, a plurality of arms carried by the rotor in position to sweep over the first conveyor to deflect articles from the same onto the second conveyor, article-engaging means adjustable on each arm, adjusting means movably carried by each arm and operatively connected to the associated article-engaging means for moving the same to or from a position on the arm wherein it is adapted to engage articles on said first conveyor, and means for actuating a selected one of said adjusting means while leaving another of said adjusting means undisturbed.

11. Article distributing apparatus comprising a first conveyor, a second conveyor arranged adjacent the first conveyor, and transfer means including a rotor rotatably mounted adjacent said conveyors, means for constantly turning the rotor, a plurality of arms carried by the rotor in position to sweep over the first conveyor to deflect articles from the same onto the second conveyor, article-engaging means adjustable on each arm, adjusting means carried by each arm and operatively connected to the associated article-engaging means for adjusting the same to operative position by moving in one direction and to inoperative position by moving in the opposite direction, toggle means operatively associated with each of said adjusting means to yieldably retain the same in either extreme position attained thereby by moving in aid directions, and means mounted adjacent the rotor for movement to either of two optional positions in each of which it is adapted to engage each of said adjusting means when the same is in one of its said extreme positions to move the adjusting means to the other of its said extreme positions.

12. Apparatus for distributing articles comprising a conveyor, a rotor including supporting means and means carried thereby for deflecting articles on the conveyor, means mounting the rotor for motion bodily toward and away from the conveyor and for rotation wherein the deflecting means sweeps transversely over the conveyor, means for turning the rotor, and selectively operable means for retaining the rotor in a position with said deflecting means moving in a path intersecting the path of articles on the conveyor or in a position moving in a path spaced from said article path.

13. Apparatus for distributing articles comprising a conveyor, a rotor rotatably mounted thereadjacent and including support means and a plurality of article deflectors carried thereby at different radial distances from the axis of rotation of the rotor, means for turning the rotor, and adjustable means for releasably retaining the rotor optionally in a position wherein all of the deflectors, or in a position wherein a number of the deflectors less than all, intersect the path of articles on the conveyor.

14. Apparatus for distributing articles comprising a conveyor, a support arm mounted for pivotal motion toward and away from the conveyor, a rotor rotatably supported by the arm in position spaced from the axis of said arms' pivotal motion, said rotor including support means and a plurality of article deflectors carried thereby at different radial distances from the rotor's axis of rotation, and means for releasably retaining the support arm in any one of a plurality of different positions of pivotal adjustment.

15. Apparatus for distributing articles comprising a conveyor, driving means therefor, a plurality of article diverting mechanisms arranged in spaced relation along the conveyor, each of the diverting mechanisms including a rotor rotatably mounted adjacent the conveyor and a plurality of article deflectors carried by the rotor in position to successively traverse the conveyor upon rotation of the rotor, the deflectors of a predetermined rotor being spaced at different radial distances from the axis of rotation of the same, selectively operable means for releasably retaining said predetermined rotor optionally in a position wherein one of the deflectors thereof, a position wherein all of the deflectors thereof, or a position wherein a number of the deflectors thereof less than all intersect the path of articles advancing on the conveyor, means for rotating the rotors, and means for operating the conveyor at a rate effecting delivery of an article to said predetermined rotor each time one of the deflectors thereof traverses the conveyor.

References Cited in the file of this patent
UNITED STATES PATENTS

| | | |
|---|---|---|
| 2,534,954 | Dalton | Dec. 19, 1950 |
| 2,602,533 | Bruce | July 8, 1952 |
| 2,649,184 | Dodge | Aug. 18, 1953 |